United States Patent [19]
Pischtschan et al.

[11] 4,174,325
[45] Nov. 13, 1979

[54] THERMOPLASTIC ABS MOULDING COMPOSITIONS WITH IMPROVED IMPACT STRENGTH

[75] Inventors: Alfred Pischtschan, Kürten; Siegfried Adelmann; Dieter Margotte, both of Krefeld, all of Fed. Rep. of Germany

[73] Assignee: Bayer Aktiengesellschaft, Leverkusen, Fed. Rep. of Germany

[21] Appl. No.: 873,531

[22] Filed: Jan. 30, 1978

[30] Foreign Application Priority Data

Feb. 4, 1977 [DE] Fed. Rep. of Germany ....... 2704679

[51] Int. Cl.$^2$ ................................................. C08K 5/10
[52] U.S. Cl. ............................. 260/32.2 N; 260/31.6; 525/84
[58] Field of Search ............. 260/31.2 N, 31.6, 880 R; 526/338

[56] References Cited

U.S. PATENT DOCUMENTS

| | | | |
|---|---|---|---|
| 2,537,036 | 1/1951 | Colbeth | 260/31.6 |
| 2,606,163 | 8/1952 | Morris et al. | 260/31.6 |
| 2,962,463 | 11/1960 | Schroeder et al. | 260/31.2 N |
| 3,232,902 | 2/1966 | Maroni | 260/31.2 N |
| 3,428,712 | 2/1969 | Carrock et al. | 260/880 R |
| 3,591,546 | 7/1971 | Christmas et al. | 260/31.2 N |
| 3,660,534 | 5/1972 | Carrock et al. | 260/880 R |
| 3,931,074 | 1/1976 | Gomez | 260/31.6 |
| 3,954,903 | 5/1976 | Kudo et al. | 260/880 R |

*Primary Examiner*—Harry Wong, Jr.
*Attorney, Agent, or Firm*—Connolly and Hutz

[57] ABSTRACT

ABS moulding compositions containing 0.1 to 10% by weight of at least one ester of an aliphatic saturated $C_{10}$ to $C_{22}$-monocarboxylic acid and an aliphatic or aromatic hydroxy compound having 1 to 6 hydroxyl groups as a processing auxiliary.

2 Claims, No Drawings

THERMOPLASTIC ABS MOULDING COMPOSITIONS WITH IMPROVED IMPACT STRENGTH

The invention relates to moulding compositions with improved impact strength, increased heat distortion stability and improved colour stability, based on elastic-thermoplastic graft copolymer mixtures with a rubber base (termed hereinafter ABS plastics), which contain 0,1–10, preferably 0.5–5 parts by weight, related to 100 parts by weight of the graft copolymer mixture of an ester or a mixture of esters of saturated aliphatic mono-carboxylic acids with 10–22 C atoms and of aliphatic or aromatic mono- to hexa-valent hydroxy compounds.

Depending on the type of application and the properties desired for their use additives can be worked into the ABS plastics, e.g. dyes, lubricants and flame-proofing agents.

Sometimes in doing so negative effects are caused apart from the desired effects.

For example bis (stearyl-/palmitoyl-) ethylene diamine, used as lubricant in most of the ABS plastics improves their flowability and thereby their thermoplastic processability. At the same time their impact strength, above all their notched impact strength, is improved.

On the other hand their heat distortion stability is reduced (DIN 53460; Vicat softening temperature). In the case of ABS-plastics, which are used as engineering plastics, this is a disadvantage to be treated seriously.

Bis-(stearyl-/palmitoyl-) ethylene diamine does not improve the notched impact strength and the impact strength of ABS plastics which have been flame-proofed. For this reason the mechanical properties of flame-proofed ABS plastics are not sufficient for many types of application.

ABS plastics for extrusion processing are in general provided with other lubricant systems than ABS for injection moulding processing. In most cases this does not reduce the heat distortion stability and often the greatest impact strength obtainable by means of additives is achieved. On the other hand the colour stability in the case of light pigmentation is unsatisfactory, especially when the extruded sheets or films are shaped by the deep draw process. For this they have to be heated for several minutes to temperatures of 240° C.–260° C. by means of radiant heat, which can easily cause yellowing of the half-finished or finished articles.

The subject of the invention are thermoplastic ABS moulding materials, which contain 0.1–10% by weight, preferably 0.5–5% by weight, of at least one ester of a saturated aliphatic monocarboxylic acid with 10–22 C atoms with an aliphatic or aromatic hydroxyl compound containing 1–6 OH-groups.

These moulding materials do not have the above-mentioned disadvantages, but do have good thermoplastic processability owing to a combination of impact strength and heat distortion stability and in addition good colour stability.

In particular the subject of the invention consists of moulding materials comprising:

A. 90–99.9 parts by weight of an ABS plastic, consisting of:
  1. 25–100% by weight of a graft polymer consisting of a
    1.1 rubber polymerized on to
    1.2 a monomer mixture comprising
      1.2.1 95–50% by weight of styrene, methylmethacrylate of mixtures thereof,
      1.2.2 50–5% by weight of acrylonitrile, methylmethacrylate or mixtures thereof, and
  2. 75–0% by weight of a copolymer of
    2.1 95–50% by weight of styrene, α-methylstyrene, methylmethacrylate or mixtures thereof,
    2.2 50–5% by weight of acrylonitrile, methacrylonitrile, methylmethacrylate or mixtures thereof
  for which
    (a) the weight ratio of (1.1) rubber to (1.2) monomer mixture is 85:15 to 40:60,
    (b) the graft copolymer (1.) in the moulding material consists of particles with an average diameter of 0,05–5μ, preferably 0.2–1.0μ,
    (c) the moulding material contains 10–35% by weight, preferably 10–30% by weight of the rubber (1.1).
B. 10–0.1 parts by weight of an ester or a mixture of esters of saturated aliphatic carboxylic acids with 10–22 C atoms and of aliphatic or aromatic 1-6-valent hydroxy compounds.

Suitable rubbers are for example diene rubbers such as homopolymers of butadiene and isoprene or their copolymers with up to 20% by weight of styrene. Also suitable are ethylene/propylene terpolymers (EPDM rubbers). These products are made up of ethylene and propylene units in the ratio 20:80 to 80:20 and contain as third component a non-conjugated diene. This third component is present in amounts of up to 15% by weight. It preferably consists of norbornadiene, hexadiene-1,5 or ethylidene norbornene. In the graft polymerization of the above-mentioned monomer mixture on to the rubber 20 to 100% of the monomers present are usually grafted. The remaining quantity is copolymerized separately and added to the mixture.

The weight ratio of rubber to graft-polymerized monomers must be 85:15 to 40:60. The graft polymers must be present in the moulding composition in the form of particles with an average diameter of 0.05 to 5μ, preferably 0.2 to 1μ. ABS graft polymers are able to be produced according to customary techniques, for example according to the descriptions in German Auslegeschrifts Nos. 1,247,665 and 1,269,360, by means of emulsion polymerization.

The esters useful according to the present invention are reaction products of 1-6-hydric aliphatic alcohols with up to 22 C atoms such as for example stearyl alcohol, ethylene glycol, glycerine, trimethylol propane, hexanetriol, erythritol, mannitol, sorbitol, pentaerythritol or aromatic hydroxy compounds such as, for example, bisphenol-A, hydroquinone, phloroglucinol, and others, with saturated aliphatic carboxylic acids with 10–22 C atoms, for example, capric acid, undecanoic acid, lauric acid, tridecanoic acid, myristic acid, palmitic acid, margaric acid, stearic acid, behenic acid, sebacic acid, dodecane diacid, brassylic acid, thapsic acid.

Suitable carboxylic acids with 10–22 C-atoms are in particular myristic acid, palmitic acid and stearic acid. The alcohols and aromatic hydroxy compounds can be esterified not only with one but also with several of these carboxylic acids.

Small amounts of polycarboxylic acids with 2–20 C-atoms, for example oxalic acid, malonic acid, adipic acid, sebacic acid and others, can optionally also be used to increase the molecular weight of the esters of the invention. For this in general up to 10 mol %, related to the total molar quantity of mono- and poly-carboxylic acid esters can be used in the chosen ester useful according to the invention.

Esters to be used according to the invention are, for example, pentaerythritol stearate, pentaerythritol palmitate, pentaerythritol myristate, mesocrythritol stearate, sorbitol stearate, sorbitol palmitate, bisphenol-A stearate, phoroglucinol palmitate, and others.

Similarly, mixtures of the esters, according to the invention, of the saturated aliphatic $C_{10}$–$C_{22}$ carboxylic acids and the 1- to 6-hydric alcohols or hydroxy compounds are suitable.

Homogeneous esters of stearic and palmitic acid with pentaerythritol, sorbitol and bisphenol-A are preferably used.

The esters of aromatic hydroxy compounds to be used according to the invention are prepared according to customary processes, for example according to the Einhorn process using pyridine as the acid-binding agent from the aromatic hydroxy compound and the acid chloride in an inert solvent.

Such processes are for example described in "Houben-Weyll, Methoden der Organischen Chemie (Methods of Organic Chemistry), Georg Thieme Publishers, Stuttgart, 1952, 4$^{th}$ edition, volume VIII, page 516 et seq.".

The aliphatic carboxylic acid esters to be used according to the invention are also prepared according to customary processes, for example according to the Einhorn process or by direct esterification from alcohol and acid with or without an esterification catalyst such as p-toluenesulphonic acid. The esterification takes place at temperatures of up to 250° C.

The moulding materials according to the invention are obtained by mixing the components according to customary methods, e.g. by joint introduction into mixing and/or kneading apparatus such as mixing rolls, single or double-shaft extruders, planetary roller extruders or internal kneading devices. The working in of the esters is advantageously conducted during the ABS compounding.

I. Preparation of the esters employed

1. Preparation of pentaerythritol stearate 8,414 kg (29.63 mols) of stearic acid are melted in a vessel at approx. 80° C. 1.12 kg (8.23 mols) of pentaerythritol are added whilst stirring and under nitrogen. The mixture is heated to 220° C. within 6 hours. The reaction mixture is kept at 220° C. for approx. 20 hours. During this time the separated water is expelled with the nitrogen stream. The reaction is continued until the acid number remains constant (below 5). In order to bring the pentaerythritol stearate into a form suitable for metering the melt is removed from the reaction vessel via a scaling device. Melting point approx. 65°–72° C., acid number under 5, OH-number 27 (equal to approx. 1% OH).

2. Preparation of sorbitol stearate 411.5 g (1.358 mols) stearic acid chloride are dissolved in 3 l toluene and heated to 90° C. 41.23 g (0.22 mols) of sorbitol, dissolved in 200 ml pyridine are added dropwise to this mixture over 25 minutes. The solution is boiled (at approx. 110° C.) for 1 hour under reflux. After cooling, dilute hydrochloric acid is added to acidify the mixture, which is then washed with water until neutral and dried with dehydrated sodium sulphate. After concentration of the organic phase the sorbitol stearate crystallizes. It is recrystallized from methanol.

A product is obtained having a melting point of 71–72° C., acid value 3, OH-value 4 Δ 0.15% by weight of OH.

3. Preparation of bisphenol-A stearate 68.4 g (0.3 mols) of bisphenol-A are dissolved in 0.9 liters of toluene and 60 ml pyridine and heated to 100° C. To this 181,8 g (0.6 mols) of stearyl chloride are added dropwise over 40 minutes. The solution is boiled (at approx. 110° C.) for one hour under reflux. After cooling, dilute hydrochloric acid is added to acidify the mixture, which is then washed with water until neutral and dried with dehydrated sodium sulphate. After concentration of the organic phase the bisphenol-A stearate crystallizes. It is recrystallized from ethanol. A product is obtained having a melting point of 79°–81° C., acid number approx. 1, OH-number below 2.

II. Preparation of the ABS graft polymers

The parts mentioned in the following Examples are—unless otherwise stated—parts by weight, in each case relating to 100 parts by weight of the polymer. The most important physical data necessary for the description of the invention are listed in the Table. The compounding is conducted on a 5 kg mixing roller at 180° C. The test specimens are produced by means of injection moulding.

Comparison specimen A

The ABS polymer employed is of medium heat distortion stability with a monomer ratio A:B:S:AMS=24:18:27:31, pigmented black with 2 % carbon black. A: acrylonitrile; B: butadiene; S: styrene; AMS: α-methylstyrene.

It contains as lubricant 2% bis(stearyl)palmitoyl-)ethylene diamine, termed hereinafter standard lubricant.

EXAMPLE 1

The ABS polymer is identical with the ABS of the comparison specimen A. Instead of the lubricant used in that specimen, in accordance with the invention 2 parts of pentaerythritol stearate (PES) were added. The positive action of PES is clearly recognizable when comparing the values contained in the Table.

EXAMPLE 2

The same ABS is employed as in the comparison specimen A. It is provided in accordance with the invention, with 2 parts of sorbitol stearate (SS). The action is basically comparable with that described in Example 1.

Comparison specimen B

This is identical with comparison specimen A, but there is a higher content of standard lubricant: 3 parts.

EXAMPLE 3

The same ABS is employed as in the comparison specimens A and B. Owing to the combined inclusion of 2 parts PES and 1 part standard lubricant a definite increase in impact strength is obtained together with optimum flowability and slightly higher heat distortion stability compared with the comparison specimen A.

Comparison specimen C

The ABS polymer is an injection moulding type with a monomer ratio A:B:S=23:13:63, made antistatic with 2 parts of polypropylene glycol with a molecular weight of approx. 2000 and pigmented white with 2 parts of titanium dioxide. It contains as lubricant 2 parts of bis(stearoyl-/palmitoyl-)ethylene diamine.

EXAMPLE 4

The same ABS is employed as in the comparison specimen C and is made antistatic and pigmented in the same way. The same compounding conditions apply on a 5 kg mixing roller apparatus. Instead of the standard lubricant, in accordance with the invention 2 parts of PES are added.

EXAMPLE 5

The difference compared with the test specimen C lies solely in that 2 parts of sorbitol stearate (SS) are used instead of 2 parts of the standard lubricant.

Comparison specimen D

The same ABS is used with the same additives and the same kind of compounding conditions as in comparison specimen C; however, instead of 2 parts it is provided with 3 parts of the standard lubricant.

EXAMPLE 6

The difference compared with the comparison specimen D lies solely in that 3 parts of PES are used instead of 3 parts of the standard lubricant.

Comparison specimen E

The ABS polymer used is a paticularly flowable type with a monomer ratio A:B:S=24.5:12.5:63. Antistatic adjustment with 3 parts polypropylene glycol of a molecular weight of approx. 2000. Coloured yellow with 1% of cadmium pigment. This specimen contains as lubricant 2 parts of bis(steroyl/palmitoyl)ethylene diamine.

EXAMPLE 7

The difference compared with the comparison specimen E lies solely in the substitution of 2 parts PES for the 2 parts of standard lubricant.

Comparison specimen F

Standard injection moulding ABS, monomer ratio A:B:S=24:15:61, coloured yellow with 1% cadmium pigment. 2 parts of the standard lubricant.

EXAMPLE 8

The difference compared with the comparison specimen F lies solely in the substitution of 2 parts of bisphenol-A stearate (BPS) for the 2 parts of the standard lubricant.

Comparison specimen G

The ABS used of a monomer ratio A:B:S=14:15:61 is flame-proofed by the inclusion of 18 parts of hexabromodiphenyl and 3 parts of antimony trioxide.

EXAMPLE 9

The sole deviation from the comparison specimen G: instead of 2 parts of the standard lubricant 2 parts of PES are employed.

Comparison specimen H

Compared with comparison specimen G the content of standard lubricant is merely raised from 2 to 3 parts. No influence on impact strength or heat distortion stability can be recognized.

EXAMPLE 10

Difference compared with comparison specimen H: instead of the standard lubricant, PES is employed, also 3 parts of this, thus representing an increase compared with Example 9.

Comparison specimen I

ABS polymer of a monomer ratio A:B:S=22:20:58, flame-proofed with 18 parts of hexabromodiphenyl and 3 parts of antimony trioxide. 2 parts of the standard lubricant.

EXAMPLE 11

Sole deviation from comparison specimen I: 2 parts of PES are worked in instead of 2 parts of the standard lubricant.

EXAMPLE 12

Contrary to Example 11 the PES content is raised from 2 to 3 parts.

Comparison specimen K

This ABS extrusion type of a monomer ratio A:B:S=30:10:60 contains 0.5 parts of calcium stearate as a processing auxiliary. The preparation by mixing is conducted by means of Werner & Pfleiderer internal kneaders in starting amounts of 70 kg, the test specimens are produced by means of injection moulding and sheet extrusion with subsequent vacuum heat-forming.

EXAMPLE 13

Difference compared with comparison specimen K: instead of 0.5 parts of calcium stearate 2 parts of PES are used as processing auxiliary. Preparation by mixing and processing as with comparison specimen K.

The advantage of the inclusion, according to the invention, of 2 parts of PES is shown in the reduced tendency towards yellowing, above all during the heating up for the vacuum forming. Under the special conditions of the deep drawing machine used (ILLIG U 60): radiator temperature, distance from object under radiation, after 3 minutes no yellowing can be visually detected either in the case of comparison specimen K or in that of the material of Example 13. After 6 minutes comparison specimen K is definitely coloured yellow, whereas a similar colour shade is not observed in the case of Example 13 until after approx. 8 minutes. After 8 minutes the comparison specimen K is coloured a deep yellowish brown.

Comparison specimen L

ABS extrusion type of a monomer ratio A:B:S=24:15:61, with 0.5 parts of calcium stearate as processing auxiliary. Pigmentation with 2 parts of titanium dioxide, preparation by mixing, processing and testing as described for comparison specimen K.

EXAMPLE 14

Difference compared with comparison specimen L: instead of 0.5 parts of calcium stearate 2 parts of PES are used as processing auxiliary.

What is clearly recognizable is, as already described in Example 13, the reduced surface yellowing during the processing steps following the extrusion: after 8 minutes infrared heating in the deep drawing machine the sheet corresponding to Example 14 is immediately isually coloured a deep yellow, in the same way as comparison specimen L is already coloured after 6 minutes. The comparison specimen L is yellowish brown after 8 minutes and much darker than the sheet of Example 14.

Comparison specimen M

An ABS is used which has been modified in the resin phase consisting of 35 parts of polybutadiene styrene/acrylonitrile graft polymer (I) and 65 parts of a copolymer (II)

I. has the following composition: 50 parts of polybutadiene as the graft base, and grafted on to this, or in part copolymerized separately: 50 parts of a monomer mixture of 36 parts of styrene and 14 parts of acrylonitrile.

II. is composed of 64 parts of styrene, 24 parts of acrylonitrile and 12 parts of maleic acid anhydride. 2 parts of bis (stearoyl-/palmitoyl-) ethylene diamine are added as lubricant to the mixture of I and II which is analogous to the ABS.

EXAMPLE 15

Deviating from comparison example M, 2 parts of PES are added as processing auxiliary instead of 2 parts of bis(stearoyl-/palmitoyl-) ethylene diamine.

Comparison specimen N

Instead of a polybutadiene styrene/acrylonitrile graft copolymer a graft copolymer consisting of an EPDM-rubber as graft base and a graft coating consisting of styrene and acrylonitrile (monomer ratio (% by weight) S:A=72:28) is used as the rubber-elastic component (I).

The resin phase is a copolymer consisting of 69 parts of styrene, 17 parts of acrylonitrile and 14 parts of maleic acid anhydride (II).

I:II=40:60 parts by weight.

EXAMPLE 16

Difference compared with comparison specimen N: solely that the bis(stearoyl-palmitoyl-) ethylene diamine is replaced by the same amount (2 parts) of PES.

| comparison specimen | Example | processing auxiliary parts | | IS DIN 53453 kJ/m² | NIS DIN 53453 kJ/m² | BIH 30″ DIN 53453 MPa | Vicat temp. B DIN 53453 °C. | flowability (spiral test) 20 × 2 mm cm |
|---|---|---|---|---|---|---|---|---|
| A | | 2 | L | 62 | 9.2 | 102 | 100 | 42 |
| | 1 | 2 | PES | 64 | 11.5 | 98 | 103 | 41 |
| | 2 | 2 | SS | 71 | 11.3 | 97 | 102 | 41 |
| B | | 3 | L | 70 | 9.3 | 99 | 98 | 42 |
| | 3 | 2 | PES | 78 | 13.1 | 96 | 102 | 42 |
| C | | 1 | L | | | | | |
| | | 2 | L | not broken | 9.5 | 105 | 95 | 46 |
| | 4 | 2 | PES | not broken | 12.1 | 102 | 98 | 44 |
| | 5 | 2 | SS | not broken | 13.3 | 101 | 97 | 43 |
| D | 6 | 3 | L | not broken | 9.3 | 104 | 94 | 47 |
| | | 3 | PES | not broken | 13.1 | 99 | 98 | 45 |
| E | | 2 | L | not broken | 6.4 | 105 | 97 | 46 |
| | 7 | 2 | PES | not broken | 7.9 | 106 | 100 | 46 |
| F | | 2 | L | not broken | 10.8 | 97 | 98 | 40 |
| | 8 | 2 | BPS | not broken | 14.1 | 94 | 100 | 40 |
| G | | 2 | L | 51 | 4.8 | | 85 | |
| | 9 | 2 | PES | 64 | 5.9 | | 87 | |
| H | | 3 | L | 49 | 4.6 | | 85 | |
| | 10 | 3 | PES | 74 | 7.9 | | 87 | |
| J | | 2 | L | not broken | 6.2 | | 87 | |
| | 11 | 2 | PES | not broken | 7.3 | | 89 | |
| | 12 | 3 | PES | not broken | 8.3 | | 89 | |
| K | | 0,5 | CaS | not broken | 16.0 | 103 | 98 | 32 |
| | 13 | 2 | PES | not broken | 16.0 | 105 | 98 | 33 |
| L | | 0,5 | CaS | not broken | 11.0 | 106 | 99 | 36 |
| | 14 | 2 | PES | not broken | 12.3 | 105 | 100 | 37 |
| M | | 2 | L | not broken | 14.5 | 93 | 107 | 27 |
| | 15 | 2 | PES | not broken | 17.1 | 91 | 111 | 28 |
| N | | 2 | L | not broken | 13.1 | 71 | 105 | 36 |
| | 16 | 2 | PES | not broken | 15.4 | 69 | 109 | 35 |

IS impact strength
NIS notched impact strength
BIH ball indentation hardness
L standard lubricant bis(stearoyl-/palmitoyl-)ethylene diamine
PES pentaerythritol stearate
SS sorbitol stearate
BPS bisphenol-A-stearate
CaS calcium stearate

What we claim is:

1. Thermoplastic ABS moulding compositions containing 0.1–10% by weight of at least one ester of a saturated aliphatic monocarboxylic acid with 10–22 C-atoms with a hydroxy compound selected from the group consisting of stearyl alcohol, ethylene glycol, glycerine, trimethylol propane, hexanetriol, erythritol, mannitol, sorbitol, pentaerythritol, bisphenol-A, hydroquinone, and phloroglucinol.

2. Moulding compositions according to claim 1, wherein the ester is pentaerythritol stearate, sorbitol stearate, or bisphenol-A stearate.

* * * * *